US009728192B2

(12) United States Patent
Zhou

(10) Patent No.: US 9,728,192 B2
(45) Date of Patent: Aug. 8, 2017

(54) METHOD AND APPARATUS FOR VOICE INTERACTION CONTROL OF MOVEMENT BASE ON MATERIAL MOVEMENT

(71) Applicant: TENCENT TECHNOLOGY (SHENZHEN) COMPANY LIMITED, Shenzhen (CN)

(72) Inventor: Bin Zhou, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/719,981

(22) Filed: May 22, 2015

(65) Prior Publication Data
US 2015/0255072 A1    Sep. 10, 2015

Related U.S. Application Data

(63) Continuation of application No. PCT/CN2013/086734, filed on Nov. 8, 2013.

(30) Foreign Application Priority Data

Nov. 26, 2012    (CN) .......................... 2012 1 0487130

(51) Int. Cl.
G10L 15/26    (2006.01)
G10L 17/22    (2013.01)
(Continued)

(52) U.S. Cl.
CPC .............. G10L 17/22 (2013.01); G10L 15/06 (2013.01); G10L 2015/0638 (2013.01); G10L 2015/088 (2013.01)

(58) Field of Classification Search
CPC ....................................................... G10L 15/26
(Continued)

(56) References Cited

U.S. PATENT DOCUMENTS 7,668,718 B2 *    2/2010    Kahn .................... G10L 15/063
                                                           704/270
8,762,152 B2 *    6/2014    Bennett ............... G06F 17/3043
                                                           704/236
(Continued)

FOREIGN PATENT DOCUMENTS

CN    1371090 A    9/2002
CN    1991982 A    7/2007
(Continued)

OTHER PUBLICATIONS

International Search Report for International Application No. PCT/CN2013/086734 dated Jan. 23, 2014, and its English translation thereof.

(Continued)

Primary Examiner — Michael N Opsasnick
(74) Attorney, Agent, or Firm — Harness, Dickey & Pierce, P.L.C.

(57) ABSTRACT

A voice interaction method and apparatus is described. The method includes setting a correspondence between an image material movement command and an interaction keyword. The method also includes displaying an image material, recording a user voice file and parsing the user voice file so as to obtain an interaction keyword. The method also includes determining, according to the interaction keyword obtained by parsing, an image material movement command corresponding to the interaction keyword, and controlling movement of the image material based on the determined image material movement command.

16 Claims, 4 Drawing Sheets

(51) Int. Cl.
*G10L 15/08* (2006.01)
*G10L 15/06* (2013.01)

(58) Field of Classification Search
USPC .................................................. 704/270–277
See application file for complete search history.

(56) References Cited

U.S. PATENT DOCUMENTS

| | | | | |
|---|---|---|---|---|
| 8,898,568 | B2* | 11/2014 | Bull | G06F 3/167 381/61 |
| 2005/0151851 | A1* | 7/2005 | Schnell | G01J 1/42 348/208.4 |
| 2006/0149558 | A1* | 7/2006 | Kahn | G10L 15/063 704/278 |
| 2008/0021708 | A1* | 1/2008 | Bennett | G06F 17/3043 704/257 |
| 2008/0240376 | A1* | 10/2008 | Conway | H04M 3/5232 379/211.01 |
| 2008/0259085 | A1 | 10/2008 | Chen et al. | |
| 2008/0300878 | A1* | 12/2008 | Bennett | G06F 17/27 704/251 |
| 2009/0182562 | A1 | 7/2009 | Caire et al. | |
| 2011/0003777 | A1 | 1/2011 | Sehested et al. | |
| 2011/0022393 | A1 | 1/2011 | Waller et al. | |
| 2011/0288850 | A1* | 11/2011 | Shen | G06F 3/038 704/2 |

FOREIGN PATENT DOCUMENTS

| | | |
|---|---|---|
| CN | 101013571 A | 8/2007 |
| CN | 201117218 Y | 9/2008 |
| CN | 101742110 A | 6/2010 |
| CN | 101855521 A | 10/2010 |
| CN | 101911146 A | 12/2010 |
| CN | 102253710 A | 11/2011 |
| CN | 102374864 A | 3/2012 |
| JP | 2002318132 A | 10/2002 |

OTHER PUBLICATIONS

Chinese Office Action for Application No. 2012104871303 dated Mar. 27, 2017, and an English concise explanation of relevance thereof.

Ma Hong, et al., Modem Management Encyclopedia: vol. 2 of 2, p. 1425, left column, lines 16-21, and an English abstract thereof.

Wang Bingxi et al., Practical Speech Recognition Foundation, pp. 216-217, and an English abstract thereof.

* cited by examiner

METHOD AND APPARATUS FOR VOICE INTERACTION CONTROL OF MOVEMENT BASE ON MATERIAL MOVEMENT

CROSS-REFERENCE TO RELATED APPLICATIONS

This application is a continuation of International Application No. PCT/CN2013/086734, filed Nov. 8, 2013. This application claims the benefit and priority of Chinese Application No. 201210487130.3, filed Nov. 26, 2012. The entire disclosures of each of the above applications are incorporated herein by reference.

FIELD

The present disclosure relates to a voice interaction method and apparatus.

BACKGROUND

This section provides background information related to the present disclosure which is not necessarily prior art.

With the rapid development of computer technologies and network technologies, the Internet and instant messaging technology are playing a more important role in people's studies, work, and everyday life. Moreover, the Internet is becoming increasingly transportable with the development of the mobile Internet.

Today's society has entered a highly developed information age and the style of corporate competition has also changed from a simple competition form centering around functions and quality of a product to a composite competition form using corporate image, commodity, brand, and the like as an important means and the main tendency. The change of the form of corporate competition is closely related to the rapid development of the modern image display industry (such as the advertisement industry).

In an existing image display method, an image provider generally provides an image material directly and actively displays an image in a network unidirectionally.

SUMMARY

This section provides a general summary of the disclosure, and is not a comprehensive disclosure of its full scope or all of its features.

Various embodiments provide a voice interaction method, so as to improve the success rate of interaction.

Various embodiments further provide a voice interaction apparatus, so as to improve the success rate of interaction.

Various embodiments further provide a mobile terminal, so as to improve the success rate of interaction.

A voice interaction method is provided, including: initiating correspondence between an image material movement command and an interaction keyword, and further including:

displaying an image material;

recording a user voice file and parsing the user voice file so as to obtain an interaction keyword; and determining, according to the interaction keyword obtained by parsing, an image material movement command corresponding to the interaction keyword and controlling movement of the image material based on the determined image material movement command.

A voice interaction apparatus is provided, including one or more processors and a memory, the memory including multiple units that can be executed by the one or more processors. The multiple units include a correspondence setting unit, an image material display unit, an interaction keyword parsing unit, and an image material movement unit, wherein the correspondence setting unit is configured to set a correspondence between an image material movement command and an interaction keyword;

the image material display unit is configured to display an image material;

the interaction keyword parsing unit is configured to record a user voice file and parse the user voice file so as to obtain an interaction keyword; and the image material movement unit is configured to determine, according to the interaction keyword obtained by parsing, an image material movement command corresponding to the interaction keyword and control movement of the image material based on the determined image material movement command.

A mobile terminal is provided, including one or more processors and a memory, the memory including multiple units which can be executed by the one or more processors. The multiple units include a display unit, a voice recording unit, and a calculation unit, wherein the display unit is configured to display an image material;

the voice recording unit is configured to record a user voice file; and the calculation unit is configured to store correspondence between an image material movement command and an interaction keyword and parse the user voice file so as to obtain an interaction keyword and determine, according to the interaction keyword obtained by parsing, an image material movement command corresponding to the interaction keyword and control movement of the image material based on the determined image material movement command.

It can be seen from the foregoing technical methods that, according to various embodiments, a correspondence between an image material movement command and an interaction keyword is set, an image material is displayed, a user voice file is recorded and the user voice file is parsed so as to obtain an interaction keyword, and an image material movement command corresponding to the interaction keyword is determined according to the interaction keyword obtained by parsing and movement of the image material is controlled based on the determined image material movement command. It can be seen from the foregoing that, after the implementation manners of the present disclosure are applied, different from a one-sided image display manner of an image provider in the existing technology, an image browser can control movement of the image material in a voice manner, and therefore, the image browser can effectively interact with the image material in the voice manner, thereby improving the success rate of interaction.

Moreover, according to various embodiments, the image material is controlled by sensing the voice of a user and an exposure degree of the image material is also improved, thereby further improving the placement effect of the image material.

Further areas of applicability will become apparent from the description provided herein. The description and specific examples in this summary are intended for purposes of illustration and are not intended to limit the scope of the present disclosure.

DRAWINGS

The drawings described herein are for illustrative purposes of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

To make the methods of the present disclosure more clear, the following further describes the present disclosure in detail with reference to the accompanying drawings.

In an existing image display method, an image provider generally provides an image material directly, and actively displays an image in a network unidirectionally. However, this display method does not involve personal participation of an image viewer and is accordingly a one-sided image display method which lacks effective interaction with the image browser, thereby resulting in a low success rate of interaction.

Therefore, various embodiments provide a voice interaction method. According to various embodiments, correspondence between an image material movement command and an interaction keyword is set, an image material is displayed, a user voice file is recorded and the user voice file is parsed so as to obtain an interaction keyword, and an image material movement command corresponding to the interaction keyword is determined according to the interaction keyword obtained by parsing, and movement of the image material is controlled based on the determined image material movement command. It can be seen that after the foregoing is performed, as opposed to a one-sided image display manner of an image provider in the existing technology, an image browser can control movement of the image material in a voice manner, and therefore, the image browser can effectively interact with the image material in the voice manner, thereby improving the success rate of interaction.

Figure 1:
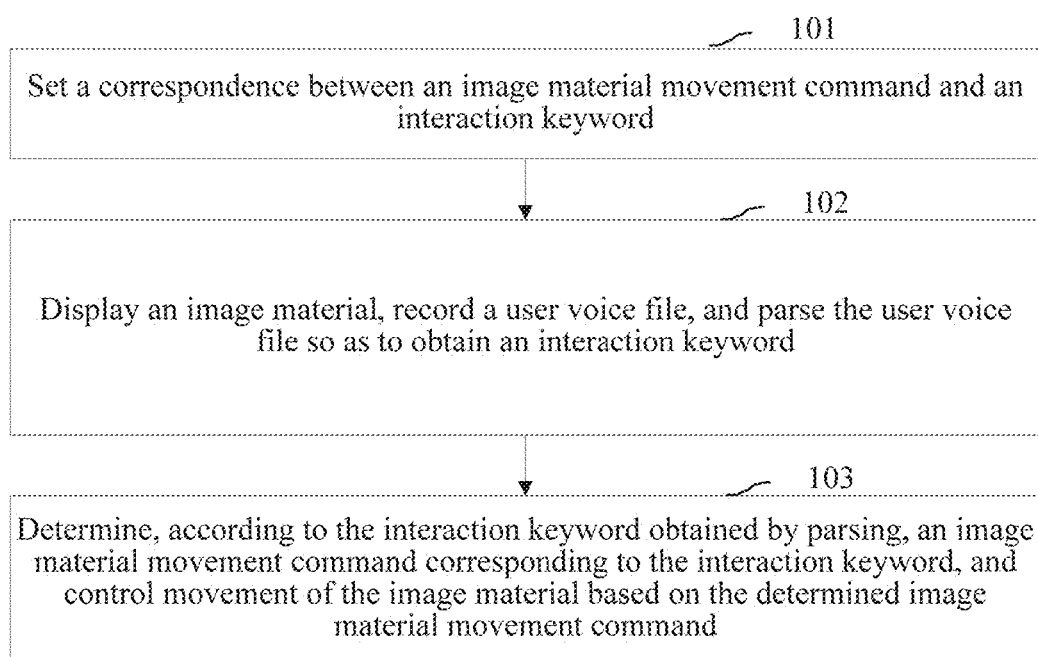
FIG. 1 is a flowchart of a voice interaction method according to various embodiments.

FIG. 1 is a flowchart of a voice interaction method according to various embodiments.

Block 101: Set a correspondence between an image material movement command and an interaction keyword. Herein, the image material movement command is used for controlling movement of an image material. The correspondence between various image material movement commands and interaction keywords may be set, where the various image material movement commands include, for example, an image material acceleration command, an image material deceleration command, an image material start command, an image material stop command, an image material moving speed maintenance command, and an image material moving track.

When a voice of a user includes an interaction keyword, movement of the image material may be controlled based on an image material movement command corresponding to the interaction keyword. For example, it may be set that an interaction keyword "start" corresponds to the image material start command, an interaction keyword "stop" corresponds to the image material stop command, an interaction keyword "accelerate" corresponds to the image material acceleration command, an interaction keyword "decelerate" corresponds to the image material deceleration command, an interaction keyword "curve" corresponds to a command of setting an image material movement track as a curve, and an interaction keyword "straight line" corresponds to a command of setting an image material movement track as a straight line.

Although examples of the image material movement command and the interaction keyword are described above in detail, one skilled in the art will be aware that the examples are merely exemplary, and are not intended to limit the protection scope of the present disclosure.

According to various embodiments, correspondence between an image material moving speed and the interaction keyword may be stored in a mobile terminal. The mobile terminal may include, but is not limited to, a functional mobile phone, a smartphone, a palmtop computer, a personal computer (PC), a tablet computer, a personal digital assistant (PDA), or the like.

Although examples of the mobile terminal are described above in detail, one skilled in the art will be aware that the examples are merely for a purpose of description and are not intended to limit the protection scope of the present disclosure. The mobile terminal is applicable to any operating system of an intelligent terminal. Operating systems that can be used include, but are not limited to, Android, Palm OS, Symbian, Windows mobile, Linux, iPhone OS, Black Berry OS 6.0, and Windows Phone series.

The mobile terminal may use an Android operating system. Android versions that the mobile terminal can use include, but are not limited to, Astro Boy (Android Beta), Clockwork Robot (Android 1.0), Cupcake (Android 1.5), Donut (Android 1.6), Muffin (Android 2.0/2.1), Froyo (Android 2.2), Gingerbread (Android 2.3), Honeycomb (Android 3.0), Ice Cream Sandwich (Android 4.0), Jelly Bean (Jelly Bean, Android 4.1), and other versions. Various versions of an Android platform are listed above in detail and one skilled in the art will recognize that the various versions are not limited to the foregoing, but are also applicable to any other version based on Android software architecture.

After the correspondence between the image material movement command and the interaction keyword is set, the next time the user controls movement of an image material through voice, block 102 may be initially performed and block 101 may not be performed again.

Block 102: Display an image material, record a user voice file, and parse the user voice file so as to obtain an interaction keyword. Herein, an image viewer, an image provider, or any other third party may upload the image material to a server on a network side in various information transmission manners and the mobile terminal then acquires the image material from the server and displays the image material. Content of the image material is related to a material that is expected to be displayed to the user. For example, assuming that information push of a branded vehicle is expected to be employed, an image of a physical model of the branded vehicle may be uploaded. Assuming that information push of an electronic product is expected to be employed, an image of a physical model of the electronic product may be uploaded.

The mobile terminal may further display a background image corresponding to the image material. There may be multiple types of background images and image materials. For example, the background image and the image material may separately be a bitmap, a Joint Photographic Experts Group (JPEG), a Tagged Image File Format (TIFF), a Graphics Interchange Format (GIF), a Portable Network Graphics (PNG) format, a three-dimensional image, and the like. Data of a GIF image file is compressed and a variable-length compression algorithm is used. Another characteristic of the GIF format is that multiple chromatic images can be stored in one GIF file, and if data of multiple images stored in one file is read gradually and is displayed on a screen, the simplest image can be formed.

According to various embodiments, an image material of the image type may be superimposed on a background image so that the image material and the background image are jointly displayed.

Figure 2:
FIG. 2 is a diagram of a vehicle-type image material according to various embodiments.

FIG. 2 is a diagram of vehicle image material according to various embodiments. It can be seen from FIG. 2 that the image material is a vehicle model and the background image is a house. The vehicle model and the house are fused and displayed together and the vehicle model stays in the house.

An information push receiver, an image provider or any other third party may further upload an image material in multiple manners. For example, the image viewer may directly upload the image material from a mobile terminal to a server in a wireless manner, by using a PC, or through various other manners. The mobile terminal may acquire the background image and the image material from the server by using a common gateway interface (CGI) and display the background image and the image material in a browser window of the mobile terminal.

A mobile terminal browser is a browser running in the mobile terminal and may be used to online browse content in the Internet by using a general packet radio service (GPRS) or through other manners. Presently, some mobile terminal browsers need to be supported by JAVA or a system of a mobile terminal (such as an IOS system of Apple and an Android platform).

The server may provide a background image to a mobile terminal or may locally pre-store a background image in the mobile terminal. The background image is stored in the server because the server has larger storage space than the mobile terminal. Therefore, a huge number of background images may be stored in the server. The background image may include a blue sky, a white cloud, a great bridge, a road, and the like.

According to various embodiments, in additional to uploading the image material, the image viewer, the image provider, or any other third party further uploads image property information used for describing a type of the image material. The image property information may be text information. The type of the image material may also be directly described by using a name of the image material. The server may determine the type of the image material according to the image property information and retrieve a background image matching the image material.

For example, assuming that the image material is information push of a vehicle, the server may retrieve a background image (such as a runway) applicable to the vehicle. Assuming that the image material is information push of an electronic product, the server may retrieve a background image (such as an office desk) applicable to the electronic product.

Herein, when the server provides the background image, the server may first send the uploaded image material and the locally stored background image to the mobile terminal and send order information and/or advertisement position information sequentially. The order information and/or the advertisement position information is then provided to the mobile terminal so that the mobile terminal correspondingly displays the information.

The background image and the image material are jointly displayed on the mobile terminal, so as to implement fusion display. The image material is displayed above or in front of the background image. After the image material is displayed to the user, the interaction process of the image material may be performed based on a voice of the user. When the user is browsing the image material, or after the user browses the image material, the user may make a voice recording. In this case, a user voice file is recorded, and the user voice file is parsed so as to obtain an interaction keyword. Herein, the user voice file may be parsed based on various speech recognition technologies, so as to obtain the interaction keyword. The speech recognition technologies mainly include a feature extraction technology, a pattern matching rule, a model training technology, and the like.

According to various embodiments, there are many types of speech recognition that can be used, for example, continuous speech recognition, keyword detection, speaker identification, speaker confirmation, speech synthesis, and audio retrieval. A Hidden Markov Model may be used in the continuous speech recognition, and according to various embodiments, various speech recognition algorithms, for example, dynamic time warping, a neural network, a support vector machine, and vector quantization, may also be used.

According to various embodiments, the various speech recognition technologies may be embedded into browser windows of various terminals by using a built-in plug-in or an interface, so that the browser windows possess a corresponding speech recognition function.

For example, a voice file input by a user may be converted into a text file, the text file is then compared with a keyword in a text format in a database, and if matching succeeds, the interaction keyword can be determined. Waveform comparison may also be performed between the voice file input by the user and an interaction keyword in a voice format. If a waveform of the voice file input by the user is consistent with a waveform of the interaction keyword in the voice format, the interaction keyword can be determined.

According to various embodiments, a voice training file and a text training file may be acquired first, a voice parameter of a voice recognizer is estimated in a voice adaptive manner by using the voice training file and the text training file, and the user voice file is identified by using the voice recognizer whose voice parameter has been estimated, so as to convert the user voice file into a text file, and the interaction keyword is then retrieved from the text file.

According to various embodiments, a speech waveform diagram of the user voice file may be determined and it is determined whether the speech waveform diagram of the user voice file includes a waveform area consistent with the speech waveform of the interaction keyword. If yes, the interaction keyword is determined based on the included speech waveform of the interaction keyword.

According to various embodiments, the image material may further be changed based on a voice. Correspondence between an image material change command and an image material change keyword may be set, the user voice file is recorded and parsed so as to obtain an image material change keyword, an updated image material corresponding to the image material change keyword is then determined according to the image material change keyword obtained by parsing, and the updated image material is displayed.

Block 103: Determine, according to the interaction keyword obtained by parsing, an image material movement command corresponding to the interaction keyword and control movement of the image material based on the determined image material movement command. Herein, the image material movement command corresponding to the interaction keyword may be determined based on the correspondence, which is set in block 101, between the image material movement command and the interaction keyword and according to the interaction keyword obtained by parsing.

For example, it is assumed that, it is set in block 101 that a keyword "start" corresponds to an image material start command, an interaction keyword "stop" corresponds to an image material stop command, an interaction keyword "accelerate" corresponds to an image material acceleration command, an interaction keyword "decelerate" corresponds to an image material deceleration command, an interaction keyword "curve" corresponds to a command of setting an image material movement track as a curve, and an interaction keyword "straight line" corresponds to a command of setting an image material movement track as a straight line.

In this case, when the interaction keyword obtained by parsing in block 102 is "start", the image material movement command can be specifically determined as the image material start command. When the interaction keyword obtained by parsing in block 102 is "stop", the image material movement command can be specifically determined as the image material stop command. When the interaction keyword obtained by parsing in block 102 is "accelerate", the image material movement command can be specifically determined as the image material acceleration command. When the interaction keyword obtained by parsing in block 102 is "decelerate", the image material movement command can be specifically determined as the image material deceleration command. When the interaction keyword obtained by parsing in block 102 is "curve", the image material movement command can be specifically determined as the command of setting the image material movement track as a curve. When the interaction keyword obtained by parsing in block 102 is "straight line", the image material movement command can be specifically determined as the command of setting the image material movement track as a straight line.

When the image material movement command corresponding to the interaction keyword is determined according to the interaction keyword obtained by parsing, movement of the image material may be controlled based on the determined image material movement command. According to various embodiments, correspondence between the interaction keyword and an image material moving speed may further be preset in block 101. For example, it is set that an interaction keyword "high-speed motion" corresponds to when the image material maintains a preset high moving speed, that is, a high moving speed maintenance command on the image material. It may further be set that an interaction keyword "intermediate-speed motion" corresponds to when the image material maintains a preset intermediate moving speed, that is, an intermediate moving speed maintenance command on the image material. It is set that an interaction keyword "low-speed motion" corresponds to when the image material maintains a preset low moving speed, that is, a low moving speed maintenance command on the image material.

When the interaction keyword obtained by parsing in block 102 is "high-speed motion", the image material movement command can be specifically determined as that where the image material maintains the preset high moving speed, and in this case, the image material is controlled to accelerate to the preset high moving speed and maintains the high moving speed. When the interaction keyword obtained by parsing in block 102 is "intermediate-speed motion", the image material movement command can be specifically determined as that where the image material maintains the preset intermediate moving speed, and in this case, the image material is controlled to accelerate to the preset intermediate moving speed and maintains the intermediate moving speed. When the interaction keyword obtained by parsing in block 102 is "low-speed motion", the image material movement command can be specifically determined as that where the image material maintains the preset low moving speed, and in this case, the image material is controlled to accelerate to the preset low moving speed and maintains the low moving speed.

Figure 3:
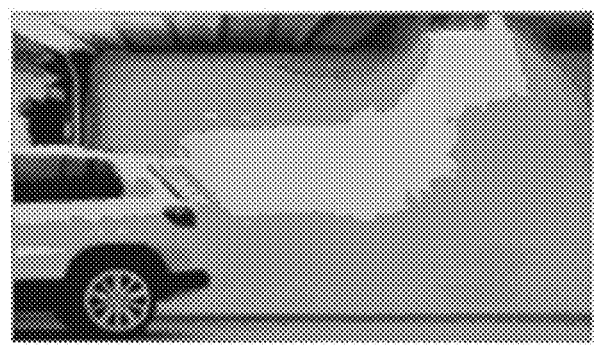
FIG. 3 is a diagram of interactive movement of a vehicle-type image material according to various embodiments.

FIG. 3 is a diagram of interactive movement of a vehicle-type image material according to various embodiments. It can be seen from FIG. 3 that an image material is a vehicle model and a background image is a house. The vehicle model and the house are fused and displayed together and the vehicle model stays above the house. When a voice of a user is sensed, the vehicle model may be moved away from the house according to an image material movement command corresponding to an interaction keyword included in the voice. When the user gets close to a camera, heat from the user may be detected by a heat sensor of the camera, and a preset engine start sound is played, so as to indicate that the vehicle model is started. Based on the foregoing detailed analysis, various embodiments further provide a voice interaction apparatus.

Figure 4:
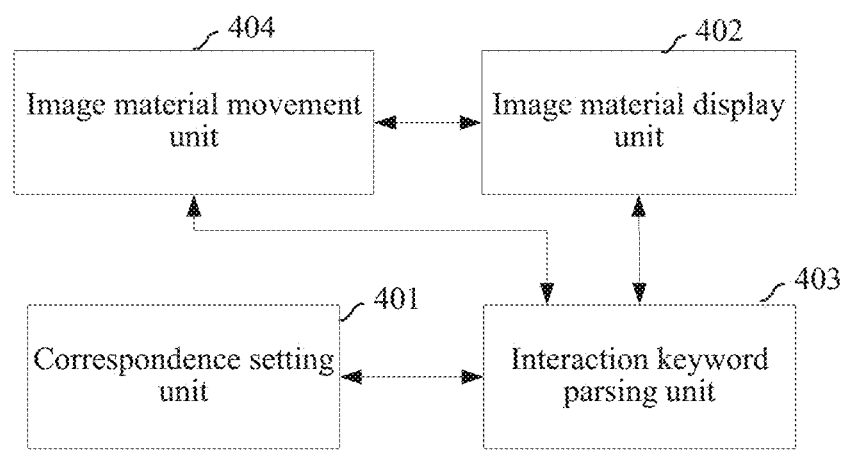
FIG. 4 is a structural diagram of a voice interaction apparatus according to various embodiments.

FIG. 4 is a structural diagram of a voice interaction apparatus according to various embodiments. As shown in FIG. 4, the apparatus includes a correspondence setting unit 401, an image material display unit 402, an interaction keyword parsing unit 403, and an image material movement unit 404, where the correspondence setting unit 401 is configured to set a correspondence between an image material movement command and an interaction keyword, where the image material movement command is used for controlling movement of an image material;

the image material display unit 402 is configured to display the image material;

the interaction keyword parsing unit 403 is configured to record a user voice file, and parse the user voice file so as to obtain an interaction keyword; and the image material movement unit 404 is configured to determine, according to the interaction keyword obtained by parsing, an image material movement command corresponding to the interaction keyword and control movement of the image material based on the determined image material movement command.

According to various embodiments, the interaction keyword parsing unit 403 is configured to acquire a voice training file and a text training file, estimate a voice parameter of a voice recognizer in a voice adaptive manner by using the voice training file and the text training file, and identify the user voice file by using the voice recognizer whose voice parameter has been estimated, so as to convert the user voice file into a text file, and retrieve the interaction keyword from the text file. According to various embodiments, the interaction keyword parsing unit 403 is configured to determine a speech waveform diagram of the user voice file and determine whether the speech waveform diagram of the user voice file includes a waveform area consistent with a speech waveform of the interaction keyword, and if yes, determine the interaction keyword based on the included speech waveform of the interaction keyword.

The correspondence setting unit 401 is configured to set a correspondence between an image material acceleration command, an image material deceleration command, an image material start command, an image material stop command, an image material moving speed maintenance command, or an image material moving track and the interaction keyword.

Figure 5:
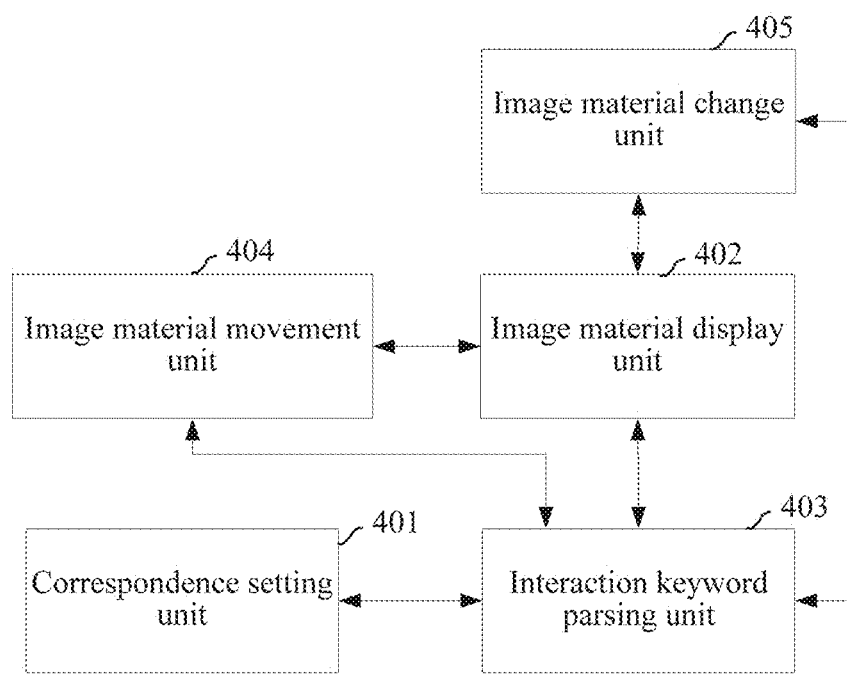
FIG. 5 is a structural diagram of another voice interaction apparatus according to various embodiments.

FIG. 5 is a structural diagram of another voice interaction apparatus according to various embodiments. As shown in FIG. 5, besides a correspondence setting unit 401, an image material display unit 402, an interaction keyword parsing unit 403, and an image material movement unit 404, the apparatus may further include an image material change unit 405, where the correspondence setting unit 401 is further configured to set a correspondence between an image material change command and an image material change keyword;

the interaction keyword parsing unit 403 is further configured to record the user voice file and parse the user voice file so as to obtain an image material change keyword;

the image material change unit 405 is configured to determine, according to the image material change keyword obtained by parsing, an updated image material corresponding to the image material change keyword, and send the updated image material to the image material display unit 402; and the image material display unit 402 is further configured to display the updated image material.

Based on the foregoing method, various embodiments may be implemented in various application environments. For example, various embodiments may be applied to an advertisement application of a mobile terminal. An interaction keyword "Audi starts" may be preset. After a user clicks on an advertisement, the user is prompted to say the prompt words "Audi starts" by using a microphone. After the user says "Audi starts", the voice keyword is parsed to obtain text, and the text is compared with the interaction keyword set in the advertisement. If the text is consistent with the interaction keyword, an advertisement behavior is triggered to make the sound of an engine when a vehicle is started, indicating that the vehicle in the advertisement has started. Moreover, tires of the vehicle in the advertisement banner rotate and the vehicle quickly moves out of an advertisement visual range, which therefore can further improve interactivity and novelty of the advertisement.

Based on the foregoing analysis, various embodiments further provide a mobile terminal.

Figure 6:
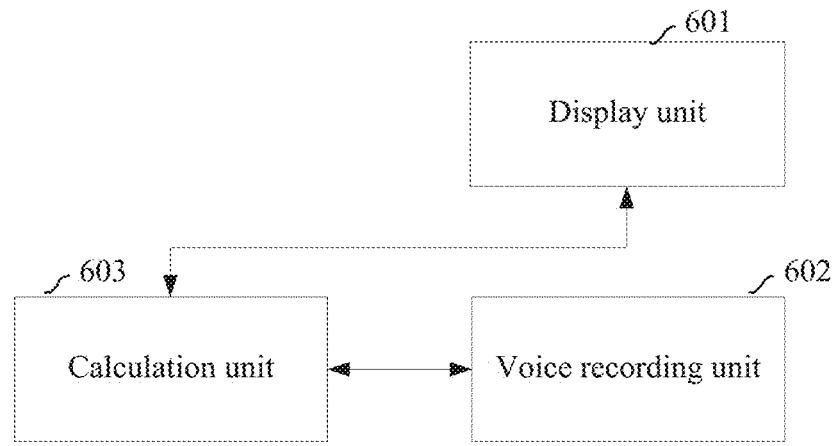
FIG. 6 is a structural diagram of a mobile terminal according to various embodiments.

FIG. 6 is a structural diagram of a mobile terminal according to various embodiments. As shown in FIG. 6, the mobile terminal includes a display unit 601, a voice recording unit 602, and a calculation unit 603, where the display unit 601 is configured to display an image material;

the voice recording unit 602 is configured to record a user voice file; and the calculation unit 603 is configured to store correspondence between an image material movement command and an interaction keyword, parse the user voice file so as to obtain an interaction keyword, determine, according to the interaction keyword obtained by parsing, an image material movement command corresponding to the interaction keyword, and control movement of the image material based on the determined image material movement command.

Figure 7:
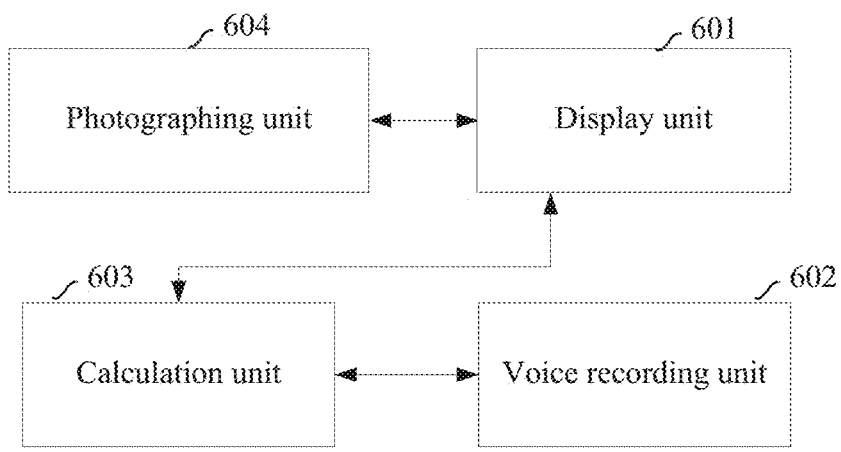
FIG. 7 is a structural diagram of another mobile terminal according to various embodiments.

FIG. 7 is a structural diagram of another mobile terminal according to various embodiments. As shown in FIG. 7, in addition to a display unit 601, a voice recording unit 602, and a calculation unit 603, the mobile terminal may further include a photographing unit 604, configured to sense heat from a user and send a heat prompt message to the display unit 601 after the heat of the user is sensed; and the display unit 601 is further configured to, after the heat prompt message is received, play an image material movement start audio.

Various embodiments may be integrated or deployed separately and may be integrated into one unit or further separated into multiple subunits. The units may be implemented by using software (such as a computer readable instruction that is executed by one or more processors and is stored in a non-volatile storage medium), hardware, or a combination of software and hardware.

Moreover, herein, an image viewer, an image provider, or any other third party may upload the image material to a server on a network side in various information transmission manners and the mobile terminal then acquires the image material from the server, and displays the image material.

The voice interaction method and apparatus provided in the various embodiments may be implemented in various manners. For example, the voice interaction method may be compiled into a plug-in program installed in a mobile terminal by using an application programming interface that follows a standard and the voice interaction method may also be encapsulated into an application program, so that the user can download and use the application program. When the voice interaction method is compiled into the plug-in program, the plug-in program may be implemented as various plug-in forms, such as ocx, dll, and cab. The voice interaction method provided in the various embodiments may also be implemented by using specific technologies, such as a Flash plug-in, a RealPlayer plug-in, an MMS plug-in, a MIDI stave plug-in, and an ActiveX plug-in.

The voice interaction method provided in the various embodiments may be stored in various storage media in a storage manner in which an instruction or an instruction set is stored. The storage media include, but are not limited to, a floppy disk, an optic disk, a DVD, a hard disk, a flash memory, a USB flash drive, a CF card, an SD card, an MMC card, an SM card, a memory stick, an xD card, and the like.

In addition, the voice interaction method provided in the various embodiments may further be applied to a storage medium based on a hand flash, such as a USB flash drive, a CF card, an SD card, an SDHC card, an MMC card, an SM card, a memory stick, and an xD card.

According to various embodiments, correspondence between an image material movement command and an interaction keyword is set and the method further includes displaying an image material, recording a user voice file and parsing the user voice file so as to obtain an interaction keyword, determining, according to the interaction keyword obtained by parsing, an image material movement command corresponding to the interaction keyword, and controlling movement of the image material based on the determined image material movement command. It can be seen from the foregoing that, according to various embodiments, instead of a one-sided image display manner of an image provider in the existing technology, movement of the image material can be controlled based on the interaction keyword of a voice file, and therefore, an image browser can effectively interact with the image material in a voice manner, thereby improving the success rate of interaction.

Moreover, according to the various embodiments, the image material is controlled by sensing the voice of a user and an exposure degree of the image material is also improved, thereby further improving a placement effect of the image material.

The foregoing descriptions are merely preferred embodiments, but are not intended to limit the protection scope of the present disclosure. Any modification, equivalent replacement, or improvement made within the spirit and principle of the present disclosure shall fall within the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A voice interaction method, comprising: setting a correspondence between an image material movement command and an interaction keyword, and further comprising:
    receiving an image material and a background image from a server; wherein the image material includes information about a product and is uploaded to the server by an information push receiver, an image provider or a third party; the background image matches the image material and is retrieved by the server through determining a type of the image material according to image property information describing the type of the image material; wherein the image property information is uploaded to the server by the information push receiver, the image provider or the third party;
    displaying the image material above or in front of the background image;
    recording a user voice file, and parsing the user voice file so as to obtain an interaction keyword; and
    determining, according to the interaction keyword obtained by parsing, an image material movement command corresponding to the interaction keyword, and controlling movement of the image material with respect to the background image based on the determined image material movement command.

2. The voice interaction method according to claim 1, wherein the parsing the user voice file so as to obtain the interaction keyword comprises:
    acquiring a voice training file and a text training file, estimating a voice parameter of a voice recognizer in a voice adaptive manner by using the voice training file and the text training file, and identifying the user voice file by using the voice recognizer whose voice parameter has been estimated, so as to convert the user voice file into a text file; and
    retrieving the interaction keyword from the text file.

3. The voice interaction method according to claim 1, wherein the parsing the user voice file so as to obtain the interaction keyword comprises:
    determining a speech waveform diagram of the user voice file; and
    determining whether the speech waveform diagram of the user voice file comprises a waveform area consistent with a speech waveform of the interaction keyword, and if yes, determining the interaction keyword based on the comprised speech waveform of the interaction keyword.

4. The voice interaction method according to claim 1, wherein the setting a correspondence between an image material movement command and an interaction keyword is:
    setting a correspondence between an image material acceleration command, an image material deceleration command, an image material start command, an image material stop command, an image material moving speed maintenance command, or an image material moving track and the interaction keyword.

5. The voice interaction method according to claim 1, comprising:
    further setting a correspondence between an image material change command and an image material change keyword, wherein the method further comprises:
    recording the user voice file, and parsing the user voice file so as to obtain an image material change keyword; and
    determining, according to the image material change keyword obtained by parsing, an updated image material corresponding to the image material change keyword, and displaying the updated image material.

6. A voice interaction apparatus, comprising one or more processors and a memory, the memory comprising multiple units that can be executed by the one or more processors, and the multiple units comprise: a correspondence setting unit, an image material display unit, an interaction keyword parsing unit, and an image material movement unit,
    the correspondence setting unit being configured to set a correspondence between an image material movement command and an interaction keyword;
    the image material display unit being configured to
    receive an image material and a background image from a server: wherein the image material includes information about a product and is uploaded to the server by an information push receiver, an image provider or a third party, the background image matches the image material and is retrieved by the server through determining a type of the image material according to the image property information describing the type of the image material, wherein the image property information is uploaded to the server by the information push receiver, the image provider or the third party; and
    display the image material above or in front of the background image;

the interaction keyword parsing unit being configured to record a user voice file, and parse the user voice file so as to obtain an interaction keyword; and the image material movement unit being configured to determine, according to the interaction keyword obtained by parsing, an image material movement command corresponding to the interaction keyword, and control movement of the image material with respect to the background image based on the determined image material movement command.

7. The voice interaction apparatus according to claim 6, wherein
the interaction keyword parsing unit is configured to acquire a voice training file and a text training file, estimate a voice parameter of a voice recognizer in a voice adaptive manner by using the voice training file and the text training file, and identify the user voice file by using the voice recognizer whose voice parameter has been estimated, so as to convert the user voice file into a text file; and retrieve the interaction keyword from the text file.

8. The voice interaction apparatus according to claim 6, wherein
the interaction keyword parsing unit is configured to determine a speech waveform diagram of the user voice file; and determine whether the speech waveform diagram of the user voice file comprises a waveform area consistent with a speech waveform of the interaction keyword, and if yes, determine the interaction keyword based on the comprised speech waveform of the interaction keyword.

9. The voice interaction apparatus according to claim 6, wherein
the correspondence setting unit is configured to set a correspondence between an image material acceleration command, an image material deceleration command, an image material start command, an image material stop command, an image material moving speed maintenance command, or an image material moving track and the interaction keyword.

10. The voice interaction apparatus according to claim 6, further comprising an image material change unit, wherein
the correspondence setting unit is further configured to set a correspondence between an image material change command and an image material change keyword;
the interaction keyword parsing unit is further configured to record the user voice file, and parse the user voice file so as to obtain an image material change keyword;
the image material change unit is configured to determine, according to the image material change keyword obtained by parsing, an updated image material corresponding to the image material change keyword, and send the updated image material to the image material display unit; and
the image material display unit is further configured to display the updated image material.

11. A mobile terminal, comprising one or more processors and a memory, the memory comprising multiple units which can be executed by the one or more processors, and the multiple units comprise: a display unit, a voice recording unit, and a calculation unit,
the display unit being configured to
receive an image material and a background image from a server: wherein the image material includes information about a product and is uploaded to the server by an information push receiver, an image provider or a third party, the background image matches the image material and is retrieved by the server through determining a type of the image material according to the image property information describing the type of the image material, wherein the image property information is uploaded to the server by the information push receiver, the image provider or the third party; and
display the image material above or in front of the background image;
the voice recording unit being configured to record a user voice file; and
the calculation unit being configured to store a correspondence between an image material movement command and an interaction keyword, and parse the user voice file so as to obtain an interaction keyword; and determine, according to the interaction keyword obtained by parsing, an image material movement command corresponding to the interaction keyword, and control movement of the image material with respect to the background image based on the determined image material movement command.

12. The mobile terminal according to claim 11, wherein the calculation unit is further configured to:
acquire a voice training file and a text training file, estimate a voice parameter of a voice recognizer in a voice adaptive manner by using the voice training file and the text training file, and identify the user voice file by using the voice recognizer whose voice parameter has been estimated, so as to convert the user voice file into a text file; and
retrieve the interaction keyword from the text file.

13. The mobile terminal according to claim 11, wherein the calculation unit is further configured to:
determine a speech waveform diagram of the user voice file; and
determine whether the speech waveform diagram of the user voice file comprises a waveform area consistent with a speech waveform of the interaction keyword, and if yes, determine the interaction keyword based on the comprised speech waveform of the interaction keyword.

14. The mobile terminal according to claim 11, wherein the correspondence between an image material movement command and an interaction keyword comprises: a correspondence between an image material acceleration command, an image material deceleration command, an image material start command, an image material stop command, an image material moving speed maintenance command, or an image material moving track and the interaction keyword.

15. The mobile terminal according to claim 11, wherein the calculation unit is further configured to store a correspondence between an image material change command and an image material change keyword; and
the calculation unit is further configured to:
parse the user voice file so as to obtain the image material change keyword; and
determine, according to the image material change keyword obtained by parsing, an updated image material corresponding to the image material change keyword, and control the display unit to display the updated image material.

16. The mobile terminal according to claim 11, further comprising a photographing unit, wherein
the photographing unit is further configured to sense heat of a user, and send a heat prompt message to the display unit after the heat of the user is sensed; and the display unit is further configured to: after the heat prompt message is received, play an image material movement start audio.

\* \* \* \* \*